Patented Aug. 26, 1952

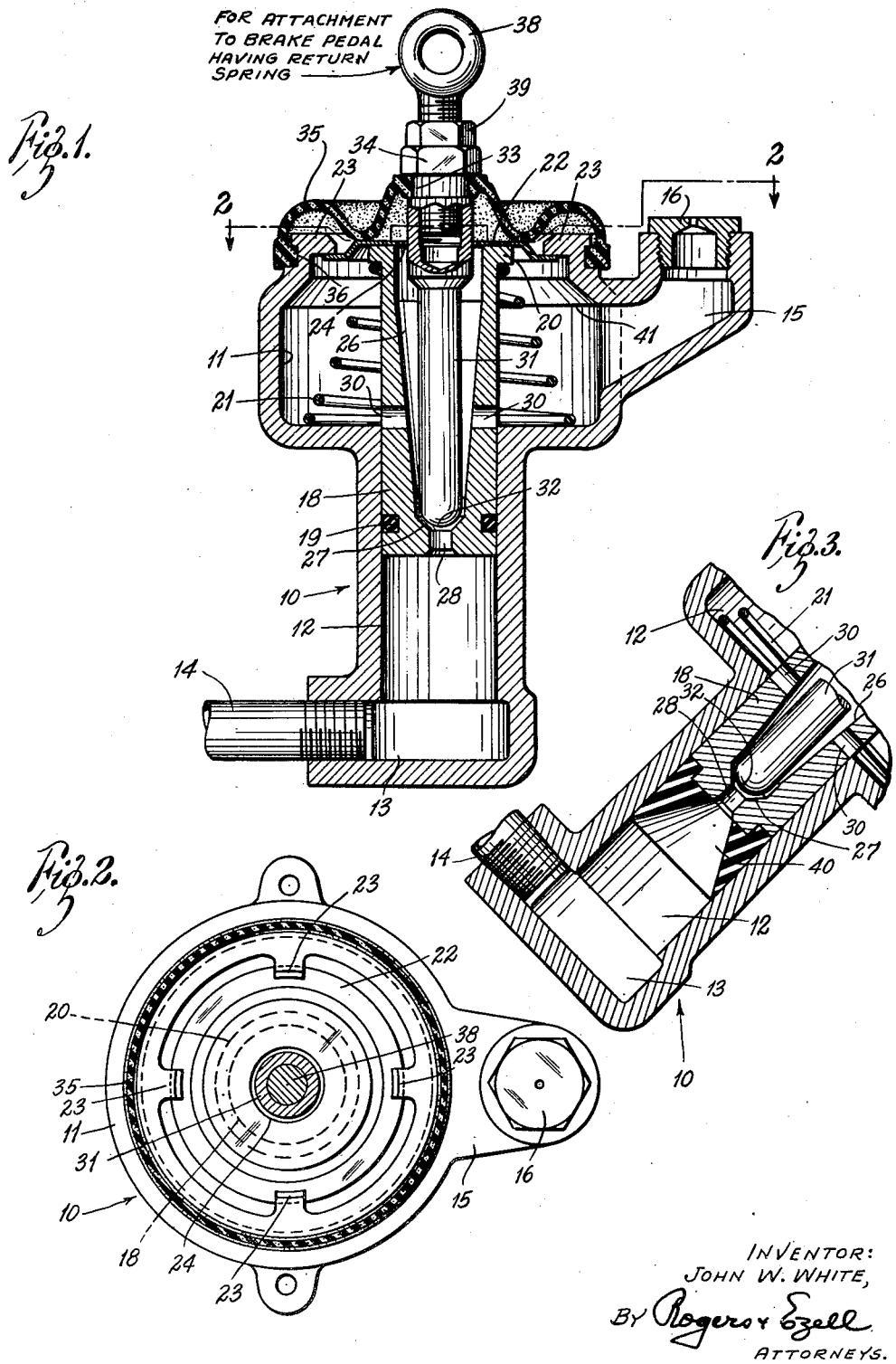

2,608,062

UNITED STATES PATENT OFFICE 2,608,062

HYDRAULIC MASTER CYLINDER ASSEMBLY

John W. White, North Hollywood, Calif.

Application June 16, 1949, Serial No. 99,415

12 Claims. (Cl. 60—54.6)

The present invention relates to a hydraulic master cylinder assembly of the type that is particularly used on hydraulic brakes, although it will be understood that the device may be used in other connections.

This particular master cylinder is one that is very simple in construction and assembly and that is very compact, particularly along its cylindrical axis. This compactness is obtained in part by the arrangement of the return spring, which arrangement also has the advantage of increasing the simplicity of assembly and disassembly of the device. Another factor contributing to compactness is the arrangement for sealing the piston.

Another feature of this master cylinder is that the parts are assured of being kept in their proper operating relationships throughout all cycles of all operation. This is especially true with respect to the piston, as its lateral stability is increased with increase in its distance of travel.

The present master cylinder is usable in connection with brakes or slave cylinders or other uses with equipment that does not require a residual pressure to be maintained in the hydraulic system leading from the cylinder of this device.

In the drawing:

Fig. 1 is a vertical diametrical section through the master cylinder assembly;

Fig. 2 is a horizontal or transverse section taken on the line 2—2 across the upper end of the assembly; and Fig. 3 is a fragmentary view of a cylinder with an angular mounting, and showing a modification of the piston packing.

In the following description, reference will be made to the disposition of the cylinder with its axis vertical, as this makes the description more convenient. The language is subject to the qualification appearing later.

The assembly includes a housing, generally indicated at 10, and having an enlarged reservoir portion 11 at its upper end, this being of relatively large diameter, and a reduced cylindrical portion 12 projecting from the bottom of the reservoir. The upper end of the reservoir is open and of a structure that will be described. The lower end of the cylinder 12 has an enlargement 13 into which a pipe 14 may be connected, this pipe typifying the outlet to slave cylinders or other apparatus to be actuated by the master cylinder assembly.

The reservoir has a filler and breather arrangement 15 projecting from one side and including the breather cap or plug 16 threaded thereinto.

Within the housing 10, there is an elongated piston 18. This piston is preferably sealed by an O-ring packing 19 toward its lower end so that it will have a sealing disposition with respect to the walls of the cylindrical portion 12. The O-ring is the preferred construction for the sealing means, although other chevron or U-type packing may be used. In fact, a conventional rubber cup may be used at the end of the piston, provided it is centrally ported for a purpose to appear. However, it is an especial feature of the invention to have the packing above the bottom of the piston.

The enlargement 13 is disposed below the machined cylinder 12, and permits machining of the cylinder to be done without end abutment of the tools in the bottom thereof. Also, the enlargement permits overtravel of the piston in cases of abnormal adjustment. In this latter case, the disposition of the piston packing at least as high as the bottom of the piston, and preferably higher, is of particular value, as a low packing would be subject to greater wear if it traveled over the end of the cylinder. Hence the high packing not only enables the cylinder to be shorter, but increases the tolerances of adjustment of the parts.

The upper end of the piston 18 has a flange 20 that receives the upper end of a tapered coil spring 21. The lower end of the coil spring 21 rests upon the bottom of the reservoir. This spring surrounds the piston and urges it upwardly. Downward movement of the piston is limited by the engagement of the top convolution of the spring 21, under the flange 20, with the bottom wall of the reservoir 11. Its upward movement is limited by a retainer disc 22 that preferably has the shape shown in the drawings. The upper opening of the reservoir 11 has a plurality of lugs 23 extending inwardly. As will be evident, the disc 22 may be warped in under these lugs, it having a smaller diameter than the interior of the mouth of the reservoir and having the upstanding middle portion that tends to stabilize against lateral movement. It also has a hole 24 through its axis.

The piston 18 has a recess 26 that extends downwardly from its upper end. It is especially desirable that the lower part of this recess 26 be conical. This recess has at its bottom a tapered valve seat 27 that converges inwardly and downwardly to a port 28 that leads through to the bottom side of the piston.

When the piston 18 is in its uppermost position, its top engages the disc 22 that, in turn, engages the lugs 23 to determine the uppermost position of the piston. That portion of the piston adjacent the bottom of the reservoir 11 in the position just mentioned is provided with a plurality of ports or passages 30 that lead through the wall of the piston to the recess 26, so that there may be free flow of fluid between the reservoir 11 and the recess 26, and ultimately between the reservoir and the cylinder 12 when the valve about to be described is open.

There is an actuating plunger generally indicated at 31. At its bottom, it is rounded as at 32 to interfit with the valve seat 27 to provide a valve. It will be understood that these valve parts may be otherwise shaped so as to form a check valve. The upper end of the plunger has a circular groove 33 around it surmounted by a hexagonal head 34. The groove is adapted to receive the inner ring-like part of a flexible rubber boot 35, that is snapped also into an external groove 36 around the upper edge of the reservoir 11. The size and shape of this boot are designed in a manner to function as will be later described.

The plunger 31 is provided with a connector extension 38, in the form of a clevis eye, that is threaded into the upper end of the plunger. The eye is adjusted to proper extension, and secured there by a lock nut 39.

In Fig. 3 the master cylinder assembly is shown as mounted at an angle to the vertical. In such cases, it is sometimes desirable to avoid any pockets that might trap air or other vapors. Hence the piston face is made into a reentrant shape, preferably conical so that twisting of the piston will not change the effect. The inner conical surface may be such as to dispose the port 28 slightly above the outer rim of the piston.

In Fig. 3, the conical piston bottom is illustrated in the form of a rubber cup 40, not as a limitation because, as already noted, there is advantage in having metal below the packing, but rather as illustrative of the use of rubber cup packing, and of an arrangement that can be easily changed to suit varying angularity. Other cups with other angles may be substituted.

*Operation*

When the unit is at rest, the plunger 31 is retracted as it is attached to the brake pedal and is raised by the normal return spring on the brake pedal. The piston 18 is retracted to the rest position shown, under the influence of the coil spring 21. Preferably, in this position, the valve portion 32 of the plunger is slightly elevated from the valve seat 27 so that there may be fluid flow between the reservoir 11 and the cylinder 12, through the passage means 30 and past the valve seat 27. This provision for fluid flow enables liquid from the reservoir 11 to flow into the cylinder 12 to maintain it fully charged, and it enables any air or other gas or vapor to rise from the system to the top of the reservoir.

When it is desired to actuate the piston, the plunger 31 is depressed, as by action of the brake pedal upon the clevis eye 38. Initial movement of the plunger 31 causes its lower hemispherical end 32 to seat in a self-centering manner against the valve seat 27, thereby closing off communication between the upper and lower sides of the piston 18. Thereafter, further depression of the plunger 31 will cause the piston 18 to be depressed, and to apply pressure to the liquid trapped in the system below the piston. This action compresses the spring 21.

When it is desired to release the brakes or other actuated devices, the pedal is released so that the plunger may quickly rise under the influence of the brake pedal return spring. The piston 18, however, does not rise so quickly, since it is required to produce a displacement of the hydraulic fluid. As a result, the valve part 32 of the plunger 31 separates itself from the valve seat 27 of the piston, giving a large, free port through the piston to enable the piston to return more rapidly than in conventional systems. Hence the recharging of the cylinder with fluid, and the escape of gas from the system can take place quickly.

This particular type of master cylinder assembly can be made very compact, especially in an axial direction. In the first place, the necessity of having a coil spring below the piston is eliminated, the space that is necessary for the reservoir also acting as the space in which to locate the piston return spring. The stability of the parts is greatly enhanced since, when the piston is up, it virtually surrounds the plunger 31 throughout its interior length, and, when the piston is down and the plunger 31 is suddenly released, the plunger has no chance of withdrawing from the recess 26, and thereby falling out of alignment with the other parts. The recess 26 has a length considerably greater than the maximum piston stroke. Also, the upstanding guide portion of the piston 18, from the ports 30 to the flange 20, desirably is of the same diameter as that of the lower part of the piston, so that it guides the piston increasingly as the piston descends.

The use of the O-ring 19 in place of the conventional cup is of great advantage as already explained, and is rendered possible by the fact that valving to any degree is not required of the packing. The total length of the cylinder and the thickness of the lower part of the piston is thereby reduced.

The boot 35, in the illustrated rest position, has a medial corrugation that rests upon the top of the retaining washer or disc 22, with some force. This holds the disc against rattling. When the piston is depressed, this corrugation, though changing diameter, remains against the disc for retaining it in place. The boot 35 is also designed to produce a displacement substantially equal to that of the piston, to minimize or prevent pumping within the reservoir. The liquid line is preferably maintained approximately at the line 41, where the reservoir converges.

The assembly of the parts is very simple. In the first instance, it is necessary only to place the O-ring 19 in position, to fit the coil spring 21 over the piston 18 from the bottom, and insert the piston into the housing 10 from the open end of the reservoir. The disc 22 can then be warped in position by slipping it under two of the lugs 23, displacing it laterally beyond the extremities of the other two lugs 23, depressing it, and then warping it back into place centrally or coaxially of the other parts. The disc remains stable in position because the upstanding central part tends to be engageable against the ends of the lugs 23 to prevent lateral displacement and also tends to engage the upper flanged part 20 of the piston for a similar purpose. The disc 22 with its opening 24 also acts to stabilize the plunger 31 and maintain it coaxial with the circular parts.

The master cylinder assembly is especially desirable for use in a vertical position, but it will be understood that it may be used in other positions. The construction of the piston, and the plunger design, provides stability during the maximum piston stroke, regardless of position. The assembly of the parts that is so simplified may be availed of in dispositions and rearrangements employing horizontal or angular mountings. Thus, while the preferred vertical arrangement is best from an over-all view, features of the invention can be used with other positions. The reservoir must, of course, be disposed so that fluid flow between it and the cylinder is always available.

What is claimed is:

1. In a master cylinder assembly, a housing having a reservoir portion and a cylindrical portion opening at its inner end into the reservoir portion, a discharge means in the outward end of the cylindrical portion, a piston reciprocable in the cylindrical portion of the housing toward and from the reservoir portion, passage means through the piston for establishing communication between the lower part of the reservoir and the cylinder beyond the piston, said passage means having a valve seat therein, extension means on the reservoir end of the piston projecting into the reservoir when the piston is in its rest position, said projecting means providing a guide recess extending from the reservoir end of the piston to said valve seat, a spring means around the piston within the reservoir and engageable between the reservoir and the projecting means on the piston to yieldably urge the piston into its said rest position, a plunger fitted into said recess, the plunger having a valve portion on its end that is engageable with said valve seat to close said passage means and thereby prevent communication from the reservoir to the cylinder, the plunger being freely retractable from the piston whereby when the plunger is actuated in one direction it will first engage the valve seat and then displace the piston against the spring away from its rest position, and whereby the plunger may be released and withdrawn from the valve seat to permit the spring to return the piston to said rest position.

2. In a master cylinder assembly, a housing having a reservoir portion and a cylindrical portion opening at its inner end into the reservoir portion, a discharge means in the outward end of the cylindrical portion, a piston reciprocable in the cylindrical portion of the housing toward and from the reservoir portion, passage means through the piston for establishing communication between the lower part of the reservoir and the cylinder beyond the piston, said passage means having a valve seat therein, extension means on the reservoir end of the piston projecting into the reservoir when the piston is in its rest position, said projecting means providing a guide recess extending from the reservoir end of the piston to said valve seat, a spring means around the piston within the reservoir and engageable between the reservoir and the projecting means on the piston to yieldably urge the piston into its said rest position, a plunger fitted into said recess, the plunger having a valve portion on its end that is engageable with said valve seat to close said passage means and thereby prevent communication from the reservoir to the cylinder, the plunger being freely retractable from the piston whereby when the plunger is actuated in one direction it will first engage the valve seat and then displace the piston against the spring away from its rest position, and whereby the plunger may be released and withdrawn from the valve seat to permit the spring to return the piston to said rest position, a removable retaining means in the reservoir and engageable by the end of the piston in said rest position to determine said extreme position and prevent further movement of the piston.

3. In a master cylinder assembly, a housing having a reservoir portion and a cylindrical portion opening at its inner end into the reservoir portion, a discharge means in the outward end of the cylindrical portion, a piston reciprocable in the cylindrical portion of the housing toward and from the reservoir portion, passage means through the piston for establishing communication between the lower part of the reservoir and the cylinder beyond the piston, said passage means having a valve seat therein, extension means on the reservoir end of the piston projecting into the reservoir when the piston is in its rest position, said projecting means providing a guide recess extending from the reservoir end of the piston to said valve seat, a spring means around the piston within the reservoir and engageable between the reservoir and the projecting means on the piston to yieldably urge the piston into its said rest position, a plunger fitted into said recess, the plunger having a valve portion on its end that is engageable with said valve seat to close said passage means and thereby prevent communication from the reservoir to the cylinder, the plunger being freely retractable from the piston whereby when the plunger is actuated in one direction it will first engage the valve seat and then displace the piston against the spring away from its rest position, and whereby the plunger may be released and withdrawn from the valve seat to permit the spring to return the piston to said rest position, a removable retaining means in the reservoir and engageable by the end of the piston in said extreme position to determine said extreme position and prevent further movement of the piston, and a flexible boot attached to the plunger and the open end of the reservoir to close the open end of the reservoir, said boot being engageable with the removable limiting means when the piston is in said extreme position, so as to limit movement of said removable means.

4. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is of the same diameter as the portion in the cylinder and is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, and means to limit the retraction of the piston.

5. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is of the same diameter as the portion in the cylinder and is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, the spring being disposed about that portion of the piston that projects into the reservoir, and means to limit the retraction of the piston.

6. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, and port means through the wall of the portion of the piston projecting into the reservoir, adjacent to the end of the reservoir adjacent the piston when the latter is retracted.

7. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, the cylinder having an enlargement adjacent its outlet end into which the piston may project in extreme movements, and packing means between the piston and the cylinder, mounted on the piston above the pressure face thereof, to enable the pressure face of the piston to project into the enlargement without the packing so doing.

8. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, the reservoir having an open end opposite the piston, a retainer movable with the piston and engageable with the housing to limit movement of the piston by the spring, a flexible boot closing the reservoir and attached to the piston, the boot having a corrugation yieldably holding the retainer against the piston during operation of the latter.

9. In a master cylinder assembly, a housing having a cylinder having an outlet at its first end and a liquid reservoir at its other end into which it opens, a piston slidable in the cylinder from a retracted position toward the reservoir, to an advance position, the piston having a length so that when in retracted position it has a substantial portion in the cylinder to hold it against misalignment and has a portion of at least substantially the length of the piston stroke extending into the reservoir beyond the cylinder, which portion is engageable with the cylinder upon advance of the piston to increase stability of the piston, an axial passage through the piston establishing communication from the reservoir to the cylinder, a plunger fitted into the passage and freely movable therein, and sized to provide liquid flow space between it and the passage, valve means to close the passage and actuated to closed position by movement of the plunger against the piston, the plunger extending beyond the reservoir for external operation, and spring means acting between the piston and the housing to urge the piston into retracted position, the reservoir having an open end opposite the piston, a retainer movable with the piston and engageable with the housing to limit movement of the piston by the spring, a flexible boot closing the reservoir and attached to the piston, the boot having a corrugation yieldably holding the retainer against the piston during operation of the latter, the boot providing substantially the same deflection as does the piston.

10. In a master cylinder assembly, a housing having an upper reservoir portion and a lower cylindrical portion of smaller diameter than the upper reservoir portion, the cylindrical portion opening into the bottom of the reservoir portion and depending therebelow, the upper end of the reservoir being open in line with said cylindrical portion, an outlet in the bottom of the cylindrical portion, a piston having a lower end slidably engageable within the cylindrical portion and having an O-ring packing between it and the walls of the cylinder above the bottom of the piston, the piston being reciprocable within the cylinder from an upper extreme position, a retaining member extendable across the upper end of the reservoir and engageable by the upper end of the piston in the released position of the piston, the upper end of the piston being outwardly flanged, a coil spring interengageable between said flange and the bottom of the reservoir and surrounding the piston to yieldably urge the piston upwardly against said retainer member, a recess extending downwardly from the upper end of the piston to adjacent the bottom thereof, and a valve seat at the bottom part of said recess with a port from the valve seat through to the bottom of the piston, the said recess being tapered inwardly and downwardly toward said valve seat, a plunger having a spherical lower end engageable with said valve seat to close off communication from the reservoir to the cylinder below the piston, the plunger extending upwardly through and above said recess and above said reservoir, passage means through the walls of the piston adjacent the bottom of the reservoir when the piston is in its upper position, the retaining member constituting a disc-like device, lugs projecting inwardly from the periphery of the reservoir adjacent the opening and spaced to enable the retainer member to be warped into position, the retainer member having an opening to receive the plunger and being engageable with said lugs and with the top of the piston, and a flexible rubber boot surrounding the plunger and enclosing the top of the reservoir, the length of the recess in the piston being greater than the length of the stroke of the piston, whereby when the plunger and piston are depressed and then the plunger is released the plunger may withdraw upwardly free of the piston but not capable of moving out of said recess.

11. The combination of claim 6, wherein the cylinder is disposable at an angle to the vertical, and the pressure face of the piston has means sloping forwardly and outwardly from the passage to avoid reentrant space in the cylinder above the passage.

12. In a master cylinder assembly, a housing having a cylinder with an outlet at one end, and a liquid reservoir with which it communicates adjacent its other end; a piston slidable in the cylinder with its working face toward the outlet, the piston having an advance position toward the outlet and a retracted position toward the point of communication of the cylinder with the reservoir, the piston having a length so that when retracted it extends a substantial distance back of the point of communication with the reservoir; the piston having an elongated socket recess extending from its back toward its working face and terminating in a passage leading from the bottom of the socket recess through the working face of the piston, to establish communication through the piston from the socket to the cylinder; the projection of the piston back of the point of communication of the cylinder with the reservoir providing a wall obstructing free flow of liquid from the reservoir into the socket when the piston is retracted, a plunger extending into the recess from the back end thereof, freely movable therein and sized to provide liquid flow in the space between it and the passage; valve means to close the passage and actuated to closed position by movement of the plunger against the piston, the plunger extending beyond the housing for external operation, spring means between the piston and the housing to urge the piston to retracted position, and port means through the wall of the piston in the portion of the wall that projects back of the point of communication of the cylinder and the reservoir when the piston is retracted, to establish liquid flow between the reservoir and the interior of the piston, whence liquid flow may occur through the passage when the valve means is open.

JOHN W. WHITE.

REFERENCES CITED

The following references are of record in the file of this patent:

UNITED STATES PATENTS

| Number | Name | Date |
| --- | --- | --- |
| 2,060,846 | Bowen | Nov. 17, 1936 |
| 2,284,935 | White | June 2, 1942 |
| 2,447,142 | Smith | Aug. 17, 1948 |
| 2,477,758 | Majneri | Aug. 2, 1949 |